United States Patent
Cardina et al.

(10) Patent No.: US 7,616,945 B1
(45) Date of Patent: *Nov. 10, 2009

(54) UPDATING OF INTELLIGENT MESSAGE WAITING NOTIFICATION

(75) Inventors: Donald Michael Cardina, Lawrenceville, GA (US); Charles Martin, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/743,072

(22) Filed: May 1, 2007

Related U.S. Application Data

(63) Continuation of application No. 10/973,300, filed on Oct. 27, 2004, now Pat. No. 7,215,946.

(51) Int. Cl.
*H04M 1/725* (2006.01)
(52) U.S. Cl. ............ 455/412.2; 455/412.1; 455/466; 379/88.12
(58) Field of Classification Search ... 455/412.1–412.2, 455/466; 379/88.12
See application file for complete search history.

(56) References Cited

U.S. PATENT DOCUMENTS

| | | | |
|---|---|---|---|
| 5,809,428 A * | 9/1998 | Garahi et al. ............ 455/517 |
| 6,208,870 B1 * | 3/2001 | Lorello et al. ............ 455/466 |
| 6,480,720 B1 * | 11/2002 | Coan et al. ............... 455/458 |
| 6,658,260 B2 | 12/2003 | Knotts | |
| 7,013,155 B1 * | 3/2006 | Ruf et al. ................ 455/466 |
| 2003/0186676 A1 * | 10/2003 | Ogman et al. ............ 455/403 |
| 2004/0180678 A1 * | 9/2004 | Smith et al. ............. 455/466 |
| 2004/0243664 A1 * | 12/2004 | Horstemeyer ........... 709/200 |
| 2005/0181766 A1 * | 8/2005 | Rooke et al. .......... 455/412.1 |

* cited by examiner

*Primary Examiner*—George Eng
*Assistant Examiner*—Nam Huynh
(74) *Attorney, Agent, or Firm*—Moazzam & Associates, LLC

(57) ABSTRACT

A system, computer-readable medium system, and method which provide for delivering notifications to a mobile device where the provider has first and second mobile technology types. Initially, a notification is received from a notification sub-system. A first communication of the notification to the mobile device is then attempted via the first technology type. Where the mobile device has the second technology type, an error signal is received that the attempt has failed. Next, a second communication of the notification to the mobile device is attempted via the second technology type. Where the mobile device has the second technology type and receives the notification, a delivery signal that the attempt was successful is received. After the delivery signal is received, logging of the second technology type of the mobile device is made so that thereafter, any new notification is attempted using the logged second technology type.

6 Claims, 4 Drawing Sheets

UPDATING OF INTELLIGENT MESSAGE WAITING NOTIFICATION

CROSS-REFERENCE TO RELATED APPLICATION

The present application is a continuation of pending U.S. patent application Ser. No. 10/973,300, filed on Oct. 27, 2004, which is hereby incorporated by reference in its entirety for all purposes.

BACKGROUND OF THE INVENTION

1. Field of Invention

This invention relates generally to providing message services to wireless/mobile users, and more particularly to providing a message waiting notifications which notify wireless/mobile devices (hereafter "mobile" devices) that a message is waiting for retrieval from the service provider.

2. Description of Related Art

For wireless/mobile data users such as cellular phone users and the like, there are a variety of short message services (SMS) which are desirable and available. SMS messages are an alternative to voice communications and are used over a cellular telephone or the like when a silent, private and/or brief communication is the best or is preferred. Typically, SMS messages are sent between users, or to and from an application. Presently, the following SMS categories usable by wireless data service users are in use: cut through paging (CTP), user-to-user text messaging, informational messaging, notification services, premium-based services, and mobile commerce.

One of the most common types of SMS is a message waiting indicator (MWI) for GSM cellular phone users, which typically falls under the SMS notification category. An MWI tells a user that they have voice mail, fax or email messages waiting, or that they have a meeting or appointment scheduled. The notification provided by an MWI is thus a key component in any voice mail, fax or email system or method having MWI notification, as this is how the user is made aware that an associated message is waiting for the user to retrieve. Since the MWI has to connect with several network elements, while the associated process and system may be conceptually simple, MWI notification is somewhat complex to implement. Generally, MWI notification uses SS7, SMS and TCP/IP network elements in order to provide infrastructure for the MWI notification service.

In a typical MWI case, a cellular user misses a call and the caller leaves a voicemail message, so that the user's handset then receives an MWI or other indicator. An icon or SMS message is used to provide the MWI to the user. By sending an MWI to the user's handset, the notification that a message has been stored and is ready for retrieval serves to ensure timely notification of receipt and response to the associated message. Presently, MWI notification is accomplished by several different methods depending on the interface used by a particular voicemail platform. For example, some of the interfaces presently being used in voicemail systems include SMDI (simplified message desk interface), SS7 MWN (message waiting notification), enhance inband, MF (multi-frequency), and HLR (home location registry) specific interfaces. All these are interfaces that are typically connected to the voicemail system and communicate directly with the HLR for the market that is being served.

In performing the MWI notification, the voicemail platform initiates a notification process by creating a short message peer to peer (SMPP) protocol message (or other protocol message, as appropriate or desired) which is delivered to an associated MWI sub-system. This indicates that one or more associated messages are in an undelivered status in the user's voice mailbox. Status of the MWI notification delivery is received by the MWI server from the VM server as the MWI delivery is attempted. The possible status values for MWI notification delivery are "delivered" and "undelivered" (typically for a feature inactive/unknown subscriber).

Many methods exist to deliver MWI, and within a single wireless provider more than one method may be used depending on the use of different vendors, hardware, growth capacity and technical requirements, any of which may or may not currently be in place. For example, an MWI notification can be sent using SMPP (short message peer to peer) protocol for GSM (global system for mobile communications) markets, while an SS7 (signaling system 7) icon-based protocol delivery method is used for IS-136 based markets.

By way of example, a successful MWI call flow for markets which are IS-136 based would be as follows. Initially, the voicemail platform sends the MWI sub-system a message over the exiting corporate LAN (local area network) via an SMPP to the MWI server. The MWI server then issues an information directive for the HLR (home location registry) via the STP (signal transfer point). The STP forwards the information directive to the IS-136 HLR (home location registry) for MWI notification delivery to the user's handset. Finally, a return status of "ok" is sent to the MWI server from the HLR through the STP. The MWI server is updated to indicate a "delivered" status, and the MWI server then notifies the voicemail platform that the WI notification was successfully delivered.

While MWI is very useful, many user complaints arise due to late or missed delivery of the MWI notification. This problem may be caused by the cellular phone not being turned on at the time that MWI notification is attempted. In such situations, the onus is then on the MWI server to deliver the MWI notification once an HLR sends a notification that the phone is back on and is ready for delivery.

SUMMARY OF THE INVENTION

One benefit of this invention is to provide a method and system for consolidating and centralizing MWI solutions where more than one solution is being utilized, including where an outside vendor has a unique solution as well.

Another benefit of the invention is the standardization of the approach to MWI. When this invention is accomplished for cellular phones, the need for voice trunk lines which may be needed in some markets is eliminated. In addition, the method and system of the invention provides a solution which provides icon-based MWI without having to purchase additional equipment, which provides an integration of wireless and wire-line messaging with a mobile network, and which enables markets to use existing voicemail platforms across multiple markets.

In an illustrated embodiment, a method and apparatus for delivering notifications to a mobile device is provided where the mobile device provider operates in first and second mobile technology types. Initially, a notification is received from a notification sub-system for the mobile device. A first communication of the notification to the mobile device is then attempted via the first technology type. Where the mobile device operates in the second technology type, an error signal is received that the attempting with the first communication has failed. Next, a second communication of the notification to the mobile device is attempted via the second technology type. Where the mobile device operates in the second technology type and receives the notification, a delivery signal that the attempting a second communication step was successful is received. After the delivery signal is received, logging of the second technology type of the mobile device is made so that thereafter for the mobile device, any new notification is attempted using the logged second technology type.

In the illustrated embodiment, where the mobile device is not reachable but is of a known technology type, that technology type is then logged.

It is also a benefit of the present invention to provide that where the mobile device becomes registered, the notification is then sent to the mobile device.

Other objects and features of the present invention are stated in or apparent from detailed descriptions of embodiments of the invention found hereinbelow.

BRIEF DESCRIPTION OF THE DRAWINGS

Various exemplary embodiments will be described in detail, wherein like reference numerals refer to identical or similar components or steps, with reference to the following figures, wherein.

DETAILED DESCRIPTION OF THE INVENTION

Figure 1:
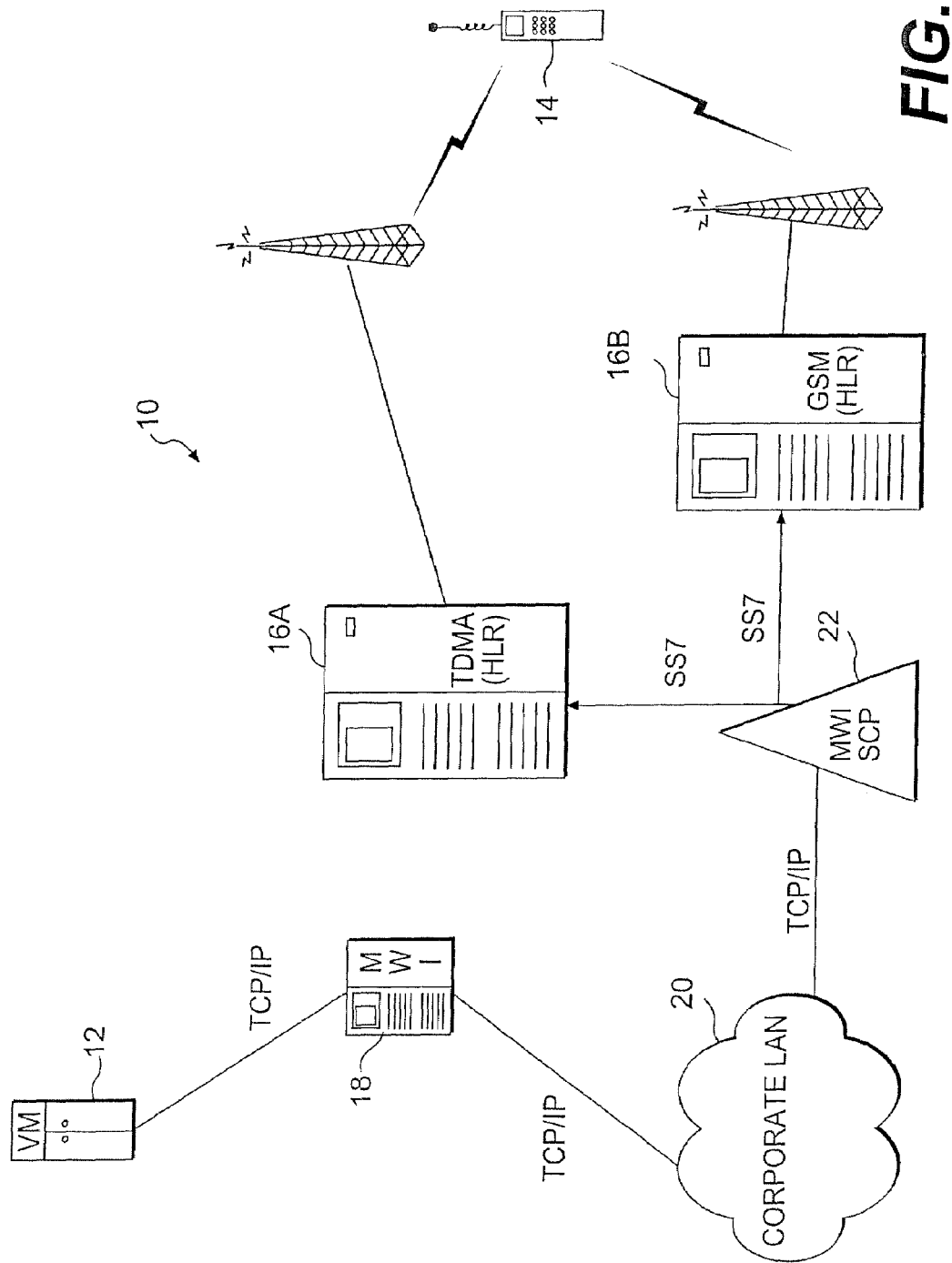
FIG. 1 illustrates a schematic representation of an exemplary embodiment of a message waiting indication (MWI) system in accordance with the present invention.

Methods and systems for updating of intelligent message waiting notifications are described hereafter. In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form rather than detail, in order to avoid obscuring the present invention.

This invention should not be construed as limited to the embodiments set forth herein. Rather, these embodiments are provided so that this disclosure will fully convey the scope of the invention to those skilled in the art. In the drawings, like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and wireless terminals according to embodiments of this invention. It is understood that each block of the block diagrams and/or operational illustrations, and combinations of the blocks in the block diagram and/or operational illustrations, can be implemented by radio frequency, analog and/or digital hardware, and/or computer program instructions.

These computer program instructions may be provided to a processor of a general-purpose computer, special purpose computer, ASIC (application-specific integrated circuit), and/or other programmable processing apparatus; and these computer program instructions create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or possibly inversely.

FIG. 1 schematically illustrates an exemplary embodiment of a message waiting indication (MWI) notification system 10 in accordance with the present invention. Initially, as noted above, MWI can be accomplished by several different methods depending on the interfaces used by a message receiving (e.g. voicemail) platform, such as voicemail platform 12, such as SMDI, SS7 MWN, enhance inband, MF, and HLR (home location registry) specific interfaces.

With the introduction of GAIT (GSM ANSI-136 (American National Standards Institute) interoperability team), it has been realized that there is a need to know what HLR and what technology a mobile 14 has in order to update mobile 14 with the correct MWI notification. For example, with the embodiment shown in FIG. 1, respective TDMA (time division/demand multiple access) and GSM (global system for mobile communications) mobile switches 16A and 16B and their connected HLRs are depicted, and it will be appreciated that these must be updated differently with respect to the signaling network messages being used for mobile 14. Thus, as there are two different methods for MWI, two different sets of support must be provided for each method including separate HLRs associated with switches 16A or 16B.

In order to support GAIT, system 10 is used to provide an MWI from voicemail platform 12 (or whatever notification sub-system is used) which attempts delivery to mobile 14 first via one method and then via the other (or even more methods if needed). In particular, when voicemail platform 12 records a message, an SMPP is sent via a TCP/IP to a message notification (MWI) delivery sub-system 18 which is typically part of the MWI server 22. This SMPP is used to indicate that one or more messages are in an undelivered status in the user's voice mailbox. The status of the MWI notification delivery is also preferably stored in delivery sub-system 18 as well. Delivery sub-system 18 then sends the MWI notification SMPP via TCP/IP over the existing corporate LAN 20 to an MWI service control point (SCP) 22 (actually, there are usually two such processors not co-located for redundancy, though only one is shown for convenience of illustration). In a presently preferred embodiment, MWI processor 22 includes a self-contained (such as Sun Netra t1400®) series system that hosts the MWI application, related libraries and APIs (application program interfaces). MWI processor 22 connects to the SS7 STPs (not separately shown, but schematically illustrated as well known in the art), either through a suitable platform (such as a MicroLegent 4000® or directly through TALI over TCP/IP (but typically not both since the platform is not needed if TALI is used). In either event, MWI processor 22 connects to the SS7-related network elements through TCP/IP and passes the SS7-related message content through these network elements. When MWI processor 22 receives the MWI notification, it determines which mobile switch 16A or 16B is associated with mobile 14 and issues an information directive through the STP to the correct mobile switch 16A or 16B for notification to mobile 14.

However, if the MWI processor does not know which associated HLR and mobile switch 16A and 16B to send the information directive to, then MWI processor 22 simply directs the MWI to one HLR and the associated switch 16A or 16B. The choice can be made based on a predetermined selection, such as switch 16A where it is known that a majority of the mobiles of the carrier use TDMA (ANSI-136)—and of course this predetermined selection could be changed later in time if sufficient numbers of the mobiles were switched (updated) and were then using GSM. If delivery of the MWI notification through switch 16A is not successful, then MWI processor 22 would then direct the MWI to the other (or second) switch 16B.

Preferably, the MWI processor 22 also includes a database which logs each successful MWI delivery. Thus, when a subsequent MWI notification was received for the same mobile 14, this database would direct the MWI notification to the correct (known) switch 16A or 16B. Of course, if mobile 14 changes from one delivery type to the other, then the database would also keep track of the subsequent failure to deliver and would try the other delivery type; and if that delivery were successful, record in the database that the other delivery type is now the correct one.

In operation, the process for the present invention is as follows. Initially, it will be appreciated that MWI system 10 is set up so that the existing technology type defines the current handset and switch which is at present predominantly in place. If TDMA (and/or GAIT) transitioning to GSM is taking place, this technology type is selected as TDMA such that new and unknown mobiles to the MWI database will attempt MWI notification using the TDMA/HLR path first, followed by the GSM/HLR path next. Of course, when a majority of the subscriber base has transitioned to GSM, this type will be changed to use the GSM/HLR path first and then the TDMA/HLR path.

Figure 2:
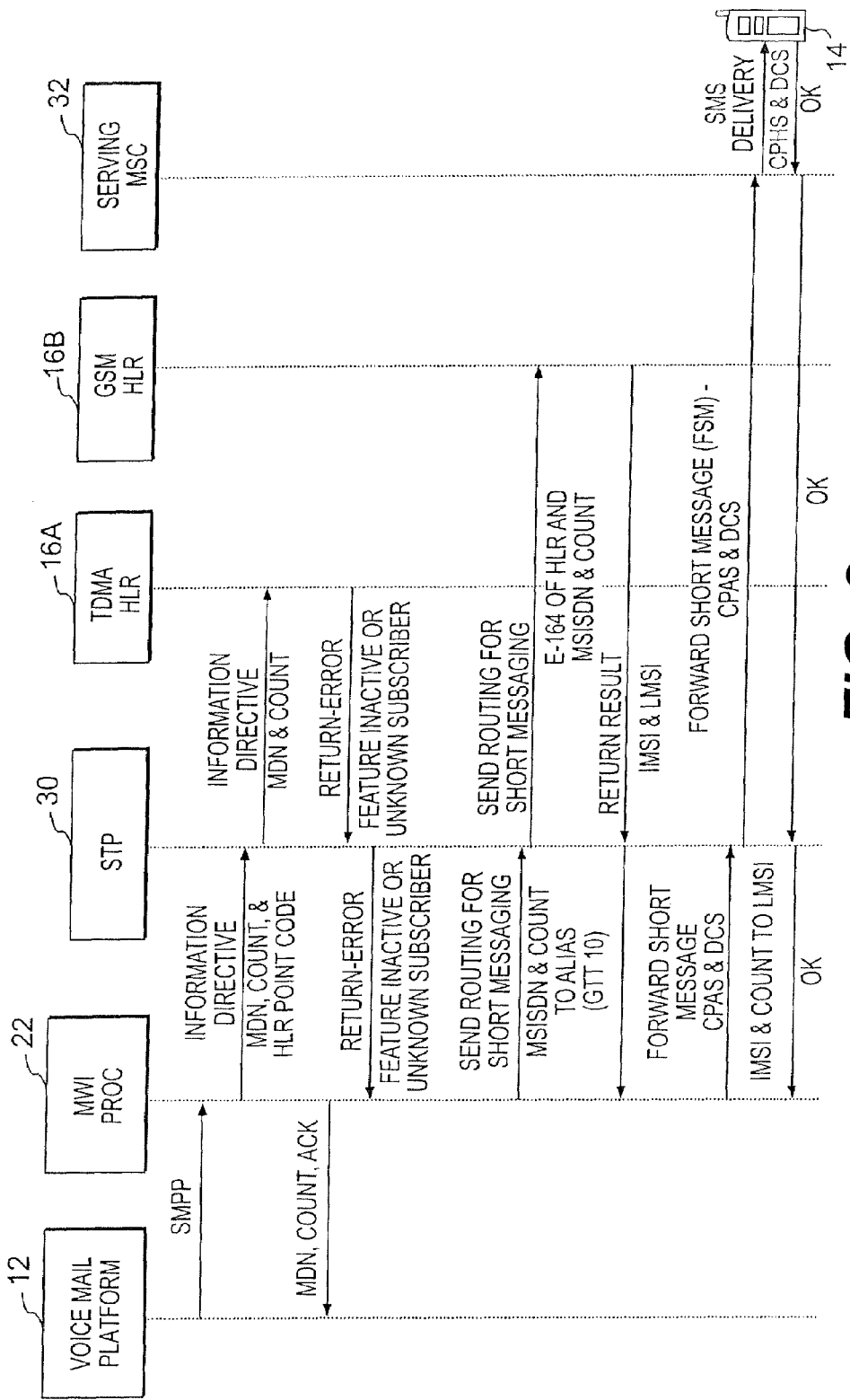
FIG. 2 illustrates a schematic flow diagram where an MWI notification is delivered to a mobile in accordance with the present invention.

In the case where mobile 14 is available, as depicted in FIG. 2, the process is as follows. When a voicemail message is left on voicemail platform 12, an SMPP notification message is sent to the associated MWI delivery processor 22 in the region for mobile 14. It will be appreciated that each region has at least one MWI server co-located near the STP in a mobile telephone switching office (MTSO); and that each MWI server connects to at least two STPs, either through a suitable platform (e.g., a MicroLegend 4000® or directly through a transport adapter layer interface (TALI) over TCP/IP (or other suitable SS7 over IP protocol). At least one extra connection to another STP is required for SS7 network redundancy in case of a network link or STP failure. The MWI SS7 configuration thus behaves like an SS7 SSP (service switching point) in terms of SS7 connectivity and service.

MWI processor 22 then reviews a local database to determine the proper technology for the MWI delivery. If mobile 14 has an entry in the MWI processor 22 local database, direct action is taken for the proper technology (GSM or TDMA). If there is no database entry, an attempt is made based on the pre-selected type. As shown in FIG. 2, no entry is present in the local database for mobile 14, so that the default/pre-selected type initially tried is TDMA. Thus, an information directive is sent via STP 30 to TDMA/HLR switch 16A. However, as mobile 14 is not of that type or at least is not available (this could be either because mobile 14 is GSM and properly registered, or because mobile 14 is a TDMA homed GAIT roaming on a GSM/HLR), a return/error message is sent back from TDMA switch 16A to MWI processor 22 as shown.

MWI processor 22 then tries the other (and successively next, if more than two) type, in this illustrated case a GSM type. A send routing information for short messaging (SRIS) request is thus sent to the GSM/HLR switch 16B, and there is thus obtained the IMSI (international mobile subscriber identity) and the LMSI (local mobile subscriber identity) of mobile 14. This information is returned by GSM/HLR switch 16B to MWI processor 22, whereby a forward short message (FSM) is in turn sent from MWI processor 22 to STP 30 for the serving MSC (mobile switching center) 32 for delivery to mobile 14 of the appropriate MWI notification. A return/acknowledge signal from mobile 14 is in turn sent back via serving MSC 32 and STP 30 to MWI processor 22 so that the delivery of the MWI notification is logged by MWI processor 22, including logging in the local database for future reference when mobile 14 again requires an MWI notification.

Figure 3:
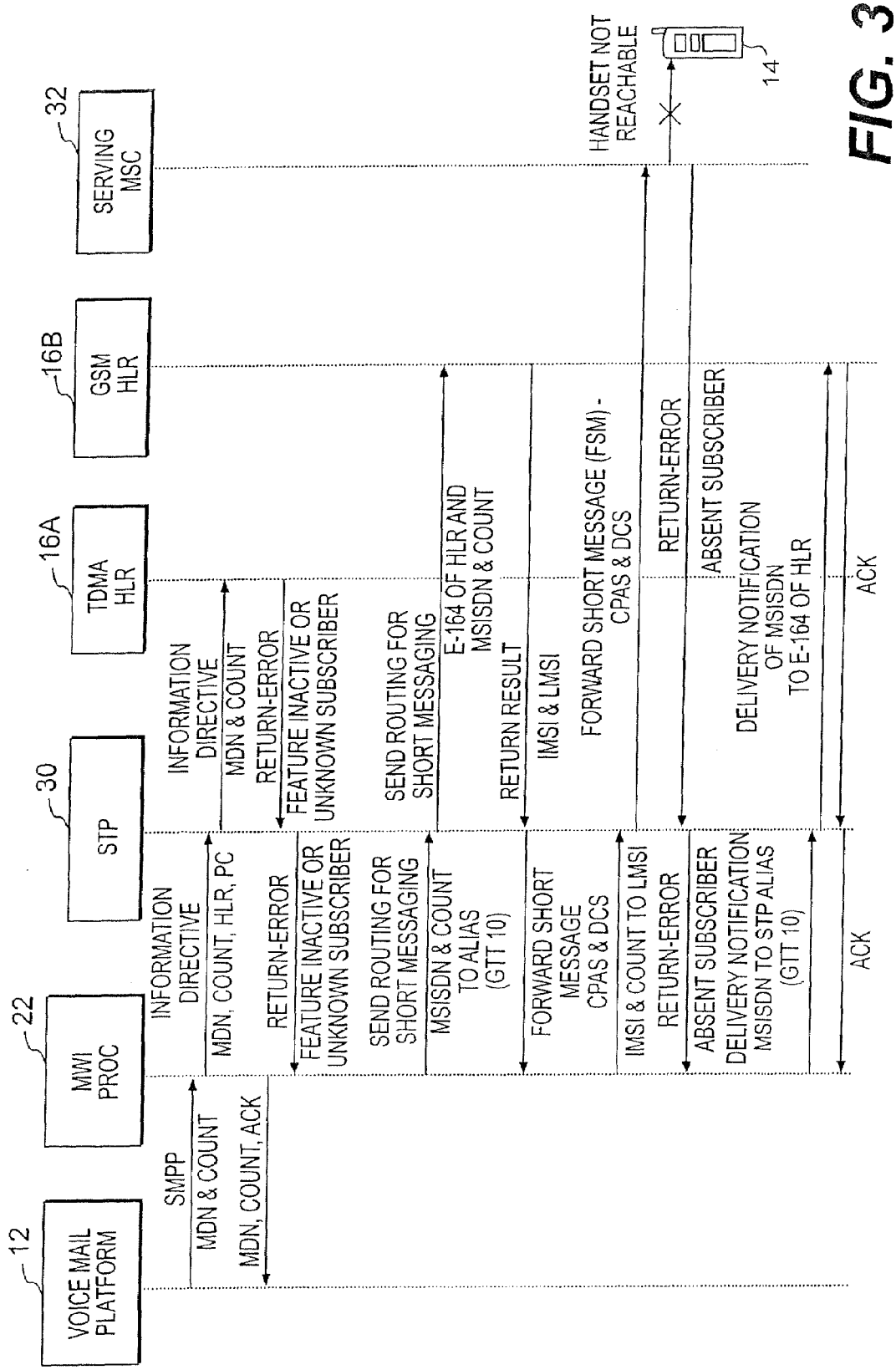
FIG. 3 illustrates a schematic flow diagram where an MWI notification is un-deliverable to a mobile in accordance with the present invention.

The case where mobile 14 is not registered on the provider's network (i.e., typically where mobile 14 is turned off, or where there are equipment problems or an over the air programming failure) is shown in FIG. 3. In this situation, the same process as described above for FIG. 2 occurs, except that instead of delivering the MWI notification with serving MSC 32, mobile 14 is not reachable from serving MSC 32. Thus, serving MSC 32 instead provides a return error message via STP 30 to MWI processor 22. Upon receipt of this message, MWI processor 22 provides a delivery notification of the MSISDN (mobile station ISDN number) to STP 30 and thus to GSM/HLR switch 16B. Switch 16B then acknowledges this notification, and waits for mobile 14 to be registered again (see FIG. 4 below).

Figure 4:
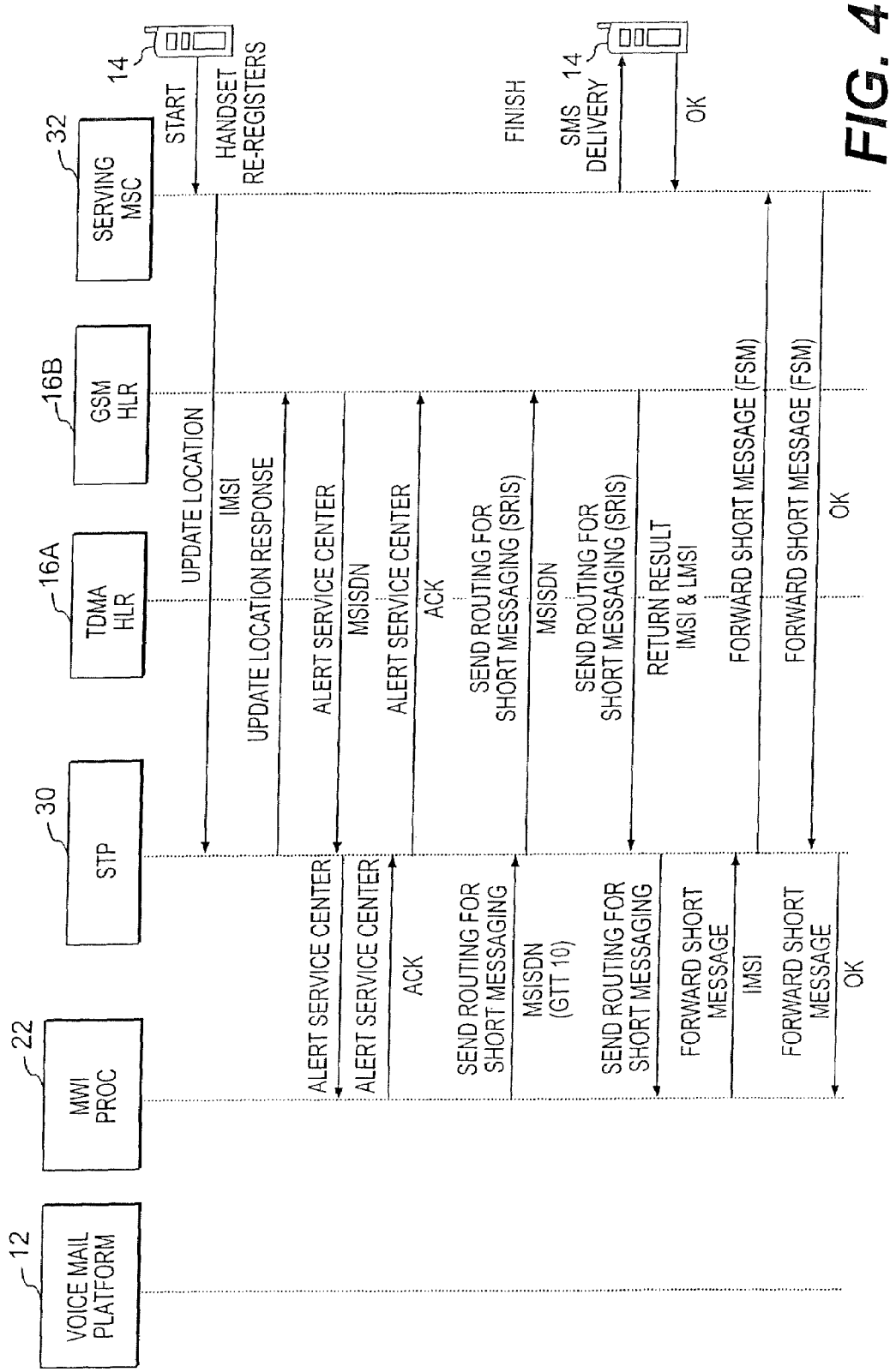
FIG. 4 illustrates a schematic flow diagram where an MWI notification which was previously un-deliverable is now delivered to a mobile in accordance with the present invention.

The case where an absent mobile 14 is once again registered after delivery is attempted and fails, as explained above with respect to FIG. 3, is shown in FIG. 4. In this situation, the continuing process is as follows. Upon registering of mobile 14, updated location information is forwarded by serving MSC 32 to STP 30 so that the this information is then provided to GSM/HLR switch 16B by STP 30. As GSM/HLR already has a delivery notification for mobile 14 (as described above in FIG. 3), MWI processor 22 is then sent an alert through STP 30, which alert is acknowledged by MWI processor 22. MWI processor 22 then sends a routing for short messaging (SRIS) message to STP 30 and GSM/HLR switch 16B, which returns the SRIS together with the IMSI and LMSI information to MWI processor 22. Using this information, MWI processor 22 then sends a forward short message (FSM) to STP 30 which in turn forwards it to serving MSC 32 for delivery to mobile 14. After receipt by mobile 14, mobile 14 acknowledges receipt of the FSM to serving MSC 32 which is passed back through STP 30 to MWI processor 22. It will be appreciated that while GSM has been described above, any suitable standard could be used as desired such as TDMA, CDMA/NEXTEL or even UMTS.

While the present invention has been described above with respect to a voicemail platform 12, it will be appreciated that the invention is also applicable to other platforms, and particularly to a cut through paging (CTP) platform using a CTP server in a similar manner. In addition, it does not have to be a VM platform providing the notification message, as it could also be such things as an email or fax server.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method of delivering a notification to a wireless device via a wireless communications network where the wireless device provider has first and second wireless technology types, the method comprising the steps of:

receiving a notification from a notification delivery subsystem for the wireless device;

attempting to communicate the notification to the wireless device via [the first technology type;

receiving, where the wireless device operates in the second technology type, an error signal that the attempting a first communication step has failed;

receiving an error signal from a serving Mobile Switching Center (MSC) indicating that the wireless device is not reachable;

delivering of a delivery notification to the location registry;

logging by the location registry of the delivery notification for the not reachable wireless device;

receiving by the location registry of updated location information from the serving MSC that the wireless device is now reachable;

alerting by the location registry to the notification processor that the wireless device is now reachable;

requesting by the notification processor from the location registry of routing for the wireless device;

receiving of the routing from the location registry by the notification processor;

forwarding of the delivery notification by the notification processor to the serving MSC for the wireless device;

forwarding of the short message notification by the serving MSC to the wireless device; attempting to communicate the notification to the wireless device via the second technology type, wherein said attempting a second communication step includes the steps of:

requesting routing for the wireless device from a location registry of the second technology type, wherein one of the first technology type or the second technology type is Time Division Multiple Access (TDMA) and the other technology type is Global System for Mobile Communication (GSM);

receiving from the location registry of the second type routing for the wireless device; and subsequently sending of a message waiting notification to the wireless device through the serving MSC;

receiving, where the wireless device operates in the second technology type and receives the notification, a delivery signal that the attempting a second communication step was successful;

logging of the second technology type of the wireless device, after the delivery signal is received, as a default technology protocol to be used in the future; and thereafter, for the wireless device, attempting communication of future notification using the logged second technology type.

2. The method of claim 1, wherein the wireless device is a cellular phone.

3. The method of claim 1, wherein the notification is a notification of a voicemail message.

4. A system for notifying a wireless device of the presence of a voicemail message via a wireless communications network where the wireless device provider has first and second wireless technology types, the system comprising:

a message waiting indicator processor;

a platform communicatively coupled to the processor for receiving a voicemail message for a wireless device;

a notification delivery sub-system which sends a message waiting indicator notification of a received message by the receiving platform to the message waiting indicator processor;

a first Home Location Register (HLR) communicatively coupled to the processor for directing a message notification via a first technology type, the first HLR sending an error signal to the message waiting processor that the attempted first communication has failed when the wireless device has a second technology type;

the message waiting indicator processor upon receiving the error signal from a first Mobile Switching Center (MSC) sending a second communication of the notification;

a second HLR communicatively coupled to the processor for directing the message notification via a second technology type, the second HLR sending connection information to the message waiting processor for the mobile device, whereby the message waiting processor sends the message waiting indicator notification to the mobile device, wherein one of the first technology type or the second technology type is Time Division Multiple Access (TDMA) and the other technology type is Global System for Mobile Communication (GSM);

a storage device communicatively coupled to the processor for storing the message notification until the mobile device becomes active on the wireless communications network, wherein upon detecting that the wireless device is active on the wireless communications network, the processor directs the message notification to the wireless device via an appropriate one of the first technology type or the second technology type; and the message waiting processor including a database for recording the technology protocol used to transmit the message notification to the mobile wireless device a serving Mobile Switching Center (MSC) through which is subsequently sent the message waiting indicator notification format to the message waiting indicator processor to the wireless device;

wherein, when the wireless device is not reachable by the first HLR, the message waiting processor delivers a delivery notification to the second HLR; and the second HLR logs the delivery notification for the not reachable wireless device;

wherein the second HLR receives updated location information from the serving MSC that the wireless device is now reachable;

wherein the second HLR alerts the message waiting indicator processor that the wireless device is now reachable;

wherein the message waiting indicator processor requests and receives from the second HLR of the routing for the now reachable wireless device;

wherein the message waiting indicator notification is forwarded by the message waiting indicator processor to the serving MSC for the wireless device; and wherein the message waiting indicator notification is forwarded by the serving MSC to the wireless device.

5. The system of claim 4, wherein the wireless device is a cellular phone.

6. The system of claim 4, wherein the logging database resides on a mobile switch.

* * * * *